United States Patent Office 3,472,763
Patented Oct. 14, 1969

3,472,763
CATALYTIC HYDROGENATION OF DIOLEFINS
Jean Cosyns, Nanterre, and Michel Derrien and Jean-François Le Page, Rueil-Malmaison, France, assignors to Institut Francais du Petrole des Carburants et Lubrifiants, Rueil-Malmaison, Hauts-de-Seine, France
No Drawing. Filed Feb. 1, 1966, Ser. No. 523,857
Claims priority, application France, Feb. 13, 1965, 5,522
Int. Cl. C07c 5/06; C10g 23/02; B01j 11/06
U.S. Cl. 208—255      21 Claims

ABSTRACT OF THE DISCLOSURE

In a process of selectively hydrogenating diolefins into their corresponding monoolefins comprising: passing a diolefin, at least a portion of which is in the liquid phase, and hydrogen in contact with the catalyst of nickel supported on an alumina substrate, the improvement comprising employing as said catalyst one having a total pore volume greater than 0.4 cm.$^3$/g. with 40 to 80% of this volume corresponding to pores with diameters greater than 0.05 micron and the volume of the pores having diameters between 0.05 and 1 micron representing at least 20% of the total volume, and the specific surface of the catalyst being at least equal to 30 m.$^2$/g.

---

This invention relates in general to a process of selectively hydrogenating diolefins to monoolefins without the formation of appreciable amounts of saturated hydrocarbons and more particularly to a catalyst therefor containing either nickel alone or in combination with a metal compound of group VI, deposited on a substrate composed of transition alumina of a particular porosity.

There has existed a need in the art for a highly active hydrogenation catalyst which is especially selective for the production of monoolefins from diolefins. In this connection, the various catalysts previously utilized have proven unsatisfactory for the reason that deleterious side reactions occur, such as cracking and/or polymerization. Aside from these side reactions which cause a low product yield, the undesired cracked by-products tend to foul the catalysts and decrease their longevity.

It is therefore a principal object of this invention to provide an improved hydrogenation catalyst having a high activity and specificity.

It is another object of the invention to provide an improved catalyst for the hydrogenation of diolefins to monoolefins.

It is still another object of the invention to provide an improved catalyst with an extended longevity which does not promote cracking and undesired polymerization reactions to any substantial extent.

These and other objects and advantages of the invention will become apparent by reference to the following description and claims appended hereto.

It has been discovered that the type of support for the catalytic elements is an important criterion in obtaining a highly active selective catalyst. In the production of monoolefins, the type of substrate and the texture thereof play an important role in optmizing the activity and selectivity of the catalyst. When the substrates of this invention are used, there are reduced to a minimum the undesirable polymerization and cracking reactions which foul the catalyst, shorten its life and render its regeneration hazardous.

In particular, it has been found in selectively hydrogenating a diolefin into a corresponding monoolefin that improved results are obtained when the diolefin and hydrogen are passed in contact with a nickel-alumina catalyst having a total pore volume greater than 0.4 cm.$^3$ per gram with 40 to 80% of this volume corresponding to pores with diameters greater than 0.05 micron, the pores with diameters between 0.05 and 1 micron representing at least 20% of the total volume and the specific surface of the catalyst being at least equal to 30 m.$^2$ per gram.

The total pore volume of the catalyst is preferably between 0.5 and 0.8 cm.$^3$/gram. On the other hand, pores with diameters between 0.05 and 1 micron preferably constitute at least 30% of this total pore volume. The specific surface of the catalyst is advantageously 40–400 m.$^2$/g., preferably between 150 and 250 m.$^2$/gram.

For the manufacture of alumina carriers, reference is made for example to French Patent No. 1,250,000.

The incorporation of nickel into the alumina is conventionally effected such as, for example by impregnating the supporting granules with an aqueous solution of a nickel salt. Another method consists of mixing and forming the components of the catalyst. Other additives and promoters can also be incorporated in the same manner. Among the other suitable additives, molybdenum is preferred. In fact, catalysts containing 1 to 10% by weight of molybdenum, in the form of $MoO_3$ in addition to nickel, have the advantage of operating, under the same conditions, at a higher sulfurization rate than nickel alone. These catalysts are also more resistant to sulfides that are generally considered harmful, such as $H_2S$, COS, $CS_2$, the alkyl disulfides or the mercaptans.

When the catalyst is prepared by impregnating the alumina substrate with an aqueous solution of the catalytic metal salts such as for example, $Ni(NO_3)_2$, $6H_2O$; $NiCl_2$, $6H_2O$; nickel diacetate tetrahydrate or

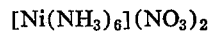

$$[Ni(NH_3)_6](NO_3)_2$$

in concentration of for example from 0.1% by weight up to saturation, the impregnated support is thereafter dried and heated to a temperature sufficient to decompose the salts of the incorporated catalytic metals. The resulting catalysts are then reduced in an atmosphere of hydrogen at a temperature between, e.g., 200 and 550° C. The nickel content expressed as NiO of the catalyst generally constitutes between 1 and 20% of the weight of the supported catalyst, and when Mo is also present, it constitutes between 1 and 10% expressed as $MoO_3$, preferably between 1 and 5% of the weight of the catalyst.

It is also advantageous to incorporate into the catalyst small amounts, e.g., 0.1 to 5% by weight (expressed as oxide) of a material selected from the group consisting of alkali metal and alkaline earth metal compounds such as sodium hydroxide, carbonate or sulfate or calcium hydroxide. These compounds are preferred but other compounds such as potassium and barium compounds can also be employed.

The presence of these precedingly described materials in the catalyst considerably increases the longevity thereof by almost entirely eliminating the formation of gums on its surface. After calcination and reduction the catalyst generally contains the alkali and alkaline earth metals as oxide, nickel is mainly present in its metallic form and the metal components of group VI are probably present as suboxide.

In a preferred embodiment of this invention, the catalyst is pretreated with a sulfur compound, for example $H_2S$, or alkyldisulfide to increase its selectivity. The pretreatment can be carried out for example by contacting the catalyst at preferably about 25° to 350° C. with a gas containing hydrogen and for example 0.7 to 2% by volume, of a gaseous sulfur compound. Nickel catalysts are very sensitive to sulfur compounds and a low amount of sulfur or a short duration of treatment is preferred. However nickel-molybdenum catalysts are less sensitive and can be more thoroughly sulfurized.

Further examples of useful sulfur compounds are open chain sulfides such as alkyl sulfides or cyclo alkyl sulfides. These sulfides can also be added to the liquid feed at the beginning of a run to maintain the catalyst at a desirable level of activity. With catalysts containing a group VI metal the sulfur pretreatment is preferably performed with $H_2S$.

The catalyst pretreated in the foregoing manner retains its selectivity even in the presence of sulfur compounds, such as the thiophenic or aromatic type, which are in the liquid charge, or added to the latter.

It should also be noted that the various catalysts of this invention are more resistant than known catalysts to attack by compounds containing basic nitrogen. However it is preferred that the latter be present only in small amounts.

This invention is generally useful for the conversion of all types of conjugated diolefins to monoolefins, in particular to the conversion of aliphatic hydrocarbon conjugated diolenes of up to 15 carbon atoms to the corresponding monoolefins.

It is also useful for the selective hydrogenation of α alkenylaromatic hydrocarbons to corresponding alkylaromatic hydrocarbons (in that case the alkenyl double bond is conjugated with the aromatic unsaturation). The conjugated dienes can be for example butadiene, isoprene and all the conjugated pentadienes, hexadienes, octadienes and also cyclic conjugated dienes such as cyclo pentadiene, cyclohexadiene, cyclooctadienes. The alkenyl aromatic hydrocarbons are for example styrene and the substituted styrenes. Even if the diolefins are not conjugated, it must be pointed out that some selectivity may be observed with the catalyst of this invention.

A particularly important application of the process of this invention is in the selective hydrogenation of gasolines containing diolefins and other gum-forming hydrocarbons. These gasolines can contain sulfurized matter in small amounts, i.e., less than about 1% by weight and can, without difficulty, be effectively catalytically hydrogenated, especially when the catalyst contains molybdenum which increases the resistance to these compounds.

In the selective hydrogenation of diolefins utilizing the catalysts of this invention, it is necessary that at least a portion, preferably at least 50% of the reactant charge remain in the liquid phase. For this purpose the total pressure of the process should be elevated to at least 10 bars and preferably between 30 and 80 bars. The spatial rate through the catalyst (v.v.h.=volume of liquid charge/volume of catalyst per hour) is advantageously between 0.5 and 10, and preferably between 1 and 4, while the ratio of hydrogen to liquid charge is between 50 and 500 liters of hydrogen per liter of charge.

The temperature of the reaction is generally between 50 and 200° C.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

In this example, the conjugated diolefin isoprene is selectively hydrogenated. The liquid charge contains the following:

Isoprene _____ mol percent__ 10
Benzene _____ do____ 90
Sulfur _____ p.p.m__ 100

The operating conditions are as follows:

Temperature=100° C. (at 40 bars)
Spatial rate (v.v.h.)=2
Molar ratio $H_2$/liquid charge=1.5

Two catalysts shown in Table 1 were prepared by the impregnation method; catalyst 1 is a conventional catalyst while catalyst 2 corresponds to the present invention.

TABLE 1

| Catalyst composition and characteristics | Catalyst 1 | Catalyst 2 |
|---|---|---|
| $Al_2O_3$ (percent by weight) | 87 | 87 |
| CaO (percent by weight) | 1 | 1 |
| NiO (percent by weight) | 12 | 12 |
| Specific surface (m.²/g.) | 275 | 240 |
| Total volume of pores (cm.³/g.) | 0.17 | 0.65 |
| Volume of pores with diameters less than 500 A. (cm.³/g.) | 0.13 | 0.33 |
| Volume of pores with diameters between 500 A. and 10,000 A. (cm.³/g.) | 0.025 | 0.27 |

Catalyst 2 was manufactured from alumina as obtained according to Example 2 of French Patent No. 1,250,000, exhibiting the following characteristics:

Specific surface _____ m.²/g.___ 300
Total pore volume _____ cm.³/g.___ 0.75
Volume of pores:
 With diameters less than 500 A. ____ cm.³/g.___ 0.37
 With diameters 500–10,000 A. _____ cm.³/g.___ 0.30

87 g. of this alumina as grains were impregnated by means of one liter aqueous solution containing 1 g. CaO as calcium nitrate. After 2 hours drying at about 100° C., the grains were impregnated with 70 cm.³ of a nickel nitrate aqueous solution at pH=8, containing 12 g. of nickel expressed as NiO.

After drying in air at 100° C., then at 250° C. for 12 hours, the catalyst was activated by heating in air at 550° C. for 3 hours, then reduced by hydrogen at 350° C. for 3 hours.

Catalyst 1 was prepared in the same way, from a conventional alumina.

As to catalyst 3 of the following example, it was also prepared in the same general way, except that the amounts of active components were altered and the alumina was an activated alumina of high microporosity.

The performances of these two catalysts are illustrated in the following Table 2.

TABLE 2

| Catalyst | Isoprene converted (mol percent) | Yield of isopentenes (mol percent) | Yield of isopentane (mol percent) |
|---|---|---|---|
| 1 | 85 | 83 | 2 |
| 2 | 100 | 99 | 1 |

It can be seen above that the use of catalyst 1 resulted in a smaller conversion and was less selective since it produced a greater yield of isopentane. Also, catalyst 1 rapidly lost its activity while catalyst 2 retained its activity and selectivity during the entire 500 hour experiment.

EXAMPLE 2

A gasoline produced by "steam cracking" having the following composition and characteristics is hydrogenated.

Chemical composition: Percent by volume
 Paraffins and naphthenes _____ 28
 Monoolefins _____ 22.5
 Diolefins _____ 6.8
 Non-olefinic aromatics _____ 40.5
 Alkenyl aromatics
  (of the styrene type) _____ 2.2
Characteristics:
 Distillation ASTM:
  Initial point _____ ° C__ 41
  Final point _____ ° C__ 178
 Density _____ 0.765
 Sulfur (p.p.m.) _____ 170

The gasoline was hydrogenated under the following conditions: T=150° C.; P=40 bars; v.v.h.=2; gaseous $H_2$/liquid charge=250 liters/liter.

In this example the catalyst 2 of Example 1 is compared with a third catalyst of the same composition and with analogous surface and total pore volume, but whose distribution of pores differs from the catalysts of this invention.

Catalyst 3 composition:

| | |
|---|---|
| $Al_2O_3$ _____percent by weight__ | 86 |
| CaO _____percent__ | 1 |
| NiO _____do____ | 13 |
| Specific surface _____$m.^2/g$__ | 200 |
| Total porous volume _____$cm.^3/g$__ | 0.55 |
| Volume of pores with diameters less than 500 A. $cm.^3/g$__ | 0.40 |
| Volume of pores with diameters between 500 A. and 10,000 A. __$cm.^3/g$__ | 0.10 |

The performances are compared in the following table.

TABLE 3

| | Product | | |
|---|---|---|---|
| Analyses | Charge | Catalyst 2 | Catalyst 3 |
| Bromine number_____ | 80 | 60 | 55 |
| Maleic anhydride value_____ | 61 | 0 | 5 |
| Research octane number clear_____ | 94 | 93 | 92 |
| Research octane number ethylated (0.5 $cm.^3$/litre of tetra-ethyl lead)_ | 99 | 99 | 99 |
| Existent gums (mg./100 $cm.^3$)_____ | 2 | 7 | 28 |
| Potential gums (mg./100 $cm.^3$)_____ | 2,000 | 8 | 300 |

The gum content of the raw gasoline is measured directly as it leaves the reactor and not after distillation thereof.

The various indicated measurements are made according to A.S.T.M. standards. The maleic anhydride index is measured according to a U.O.P. standard (U.O.P. method 326.58).

It can be seen from the results of the tests above that catalyst 3 having a much smaller proportion of macropores has a lower activity since the product content of conjugated diolefins and unstable compounds (maleic anhydride value and potential gums) is still very high. It is also evident that the selectivity of catalyst 3 is less than catalyst 2 because the olefin content (bromine index of the product) of the former is lower while the undesirable polymerization side reactions are more pronounced (more gums present).

EXAMPLE 3

The same charge used in Example 2 is treated with a catalyst of the following composition (catalyst No. 4):

| | |
|---|---|
| $Al_2O_3$ _____percent by weight | 86 |
| $K_2O$ _____do____ | 1 |
| NiO _____do____ | 10 |
| $MoO_3$ _____do____ | 3 |
| Specific surface _____$m.^2/g$__ | 230 |
| Total porous volume _____$cm.^3/g$__ | 0.65 |
| Volume of pores with diameters smaller than 500 A. _____$cm.^3/g$__ | 0.34 |
| Volume of pores with diameters between 500 and 10,000 A. _____$cm.^3/g$__ | 0.26 |

This catalyst produced in accordance with this invention is sulfurized under severe conditions, namely at 350° C. in a current of hydrogen containing 0.5 to 1% by volume of $H_2S$ or a mercaptan in the gaseous state.

The experimental conditions are the same as in Example 2, except that the reaction is conducted under a pressure of 56 bars and a temperature of 180° C.

The characteristics of the gasoline obtained are as follows:

| | |
|---|---|
| Bromine number _____ | 58 |
| Maleic anhydride value _____ | 0 |
| Research octane number clear _____ | 93 |
| Research octane number ethylated (0.5 $cm.^3$/litre) __ | 99 |
| Existent gums (mg./100 $cm.^3$) _____ | 9 |
| Potential gums (mg./100 $cm.^3$) _____ | 25 |

As to the manufacture of the catalyst used in this example, the same general process as described in Example 1 was followed except that the amounts of active components were changed to give the above amounts and molybdenum was used to ammonium paramolybdate.

EXAMPLE 4

Other catalysts were manufactured in the same general way and exhibited the following characteristics:

| | Catalyst | |
|---|---|---|
| | No. 5 | No. 6 |
| $Al_2O_3$ (Percent by weight)_____ | 82 | 89 |
| $Na_2O$ (Percent by weight)_____ | 1 | 1 |
| NiO (Percent by weight)_____ | 17 | 10 |
| Specific surface ($m.^2/g$)_____ | 45 | 200 |
| Porous volume ($cm.^3/g$.): | | |
| Total_____ | 0.80 | 0.53 |
| Pores lower than 500 A._____ | 0.28 | 0.27 |
| Pores between 500 and 10,000 A._____ | 0.52 | 0.20 |

When these catalysts were used as described in Example 2 except that the temperature was 130° C. and the pressure was 28 $kg./cm.^2$ the following results were obtained:

| | | Product | |
|---|---|---|---|
| | Charge | With catalyst No. 5 | With catalyst No. 6 |
| Existent gums (mg./100 $cm.^3$)_____ | 2 | 6 | 10 |
| Maleic anhydride value_____ | 61 | 0.2 | 0.2 |
| Bromine number_____ | 80 | 65 | 60 |

The preceding examples can be repeated with similar success by substituting the generally and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages, and conditions Consequently, such changes and modifications are properly, equitably, and intended to be, within the full range of equivalence of the invention.

What is claimed is:

1. In a process of selectively hydrogenating diolefins into their corresponding monoolefins comprising: passing a diolefin at least a portion of which is in the liquid phase and hydrogen in contact with a catalyst of nickel supported on an alumina substrate, the improvement comprising employing as said catalyst one having a total pore volume greater than 0.4 $cm.^3/g$. with 40 to 80% of this volume corresponding to pores with diameters greater than 0.05 micron and the volume of the pores having diameters between 0.05 and 1 micron representing at least 20% of the total volume, and the specific surface of the catalyst being at least equal to 30 $m.^2/g$.

2. The process of claim 1 wherein the catalyst contains molybdenum.

3. The process of claim 1 wherein the catalyst contains 1 to 10% molybdenum, expressed as $MoO_3$.

4. The process of claim 1 wherein the catalyst contains 1 to 20% by weight of nickel, expressed as NiO.

5. The process of claim 1 wherein the total volume of the pores is between 0.5 and 0.8 $cm.^3/g$.

6. The process of claim 1 wherein at least 30% of the total pore volume corresponds to pores with diameters between 0.05 and 1 micron.

7. The process of claim 1 wherein the specific surface of the catalyst is between 150 and 250 $m.^2/g$.

8. The process of claim 1 wherein the catalyst contains 0.1 to 5% by weight expressed as oxide of a material selected from the group consisting of alkali metals and alkaline earth metals.

9. The process of claim 1 wherein the catalyst is first treated with a gaseous sulfur compound.

10. The process of claim 1 wherein the temperature of the reaction is maintained between 50 and 200° C.

11. The process of claim 1 wherein the reaction is performed under a pressure above 10 bars.

12. The process of claim 1 wherein the reaction is performed under pressures between 30 and 80 bars.

13. The process of claim 1 wherein the spatial rate is between 0.5 to 10 volumes liquid of charge per volume of catalyst per hour.

14. The process of claim 1 wherein the amount of added hydrogen is between 50 and 500 liters per liter of charge.

15. The process of claim 1 wherein the charge consists of a gasoline from steam cracking.

16. The process of claim 9 wherein the catalyst is first treated with a gas containing hydrogen and 0.7 to 2% by volume of a sulfur compound selected from the group consisting of hydrogen sulfide and alkyl disulfide.

17. A catalyst consisting essentially of nickel deposited on an alumina substrate, 0.1–5% by weight of said catalyst being selected from the group consisting of an alkaline earth metal compound and an alkali metal compound, expressed as oxide, said catalyst having a total pore volume greater than 0.4 cm.$^3$/g. with 40 to 80% of this volume corresponding to pores with diameters greater than 0.05 micron and the volume of the pores having diameters between 0.05 and 1 micron representing at least 20% of the total volume, and the specific surface of the catalyst being at least to 100 m.$^2$/g.

18. A catalyst as defined by claim 17 wherein 1–20% by weight of said catalyst is nickel, expressed as NiO.

19. A catalyst as defined by claim 18 wherein 1–10% by weight of said catalyst is molybdenum, expressed as MoO$_3$.

20. A catalyst as defined by claim 18 wherein said catalyst has been pretreater with a gas consisting essentially of hydrogen and about 0.7 to 2% by volume of a gaseous sulfur compound.

21. A catalyst as defined by claim 17 wherein said catalyst has been pretreated with a gas consisting essentially of hydrogen and about 0.7 to 2% by volume of a gaseous sulfur compound.

References Cited

UNITED STATES PATENTS

| | | | |
|---|---|---|---|
| 3,067,128 | 12/1962 | Kimberlin et al. | 252—466 |
| 3,116,233 | 12/1963 | Douwes et al. | 208—143 |
| 3,205,281 | 7/1965 | Fleming et al. | 260—683 |
| 3,234,298 | 2/1966 | Langhout et al. | 260—677 |
| 3,242,101 | 3/1966 | Erickson et al. | 208—143 |

FOREIGN PATENTS 1,250,000   11/1960   France.

DELBERT E. GANTZ, Primary Examiner

C. E. SPRESSER, Assistant Examiner

U.S. Cl. X.R.

208—143; 252—463, 465, 466; 260—666, 677, 668